United States Patent [19]

Kumasaka et al.

[11] Patent Number: 4,769,729
[45] Date of Patent: Sep. 6, 1988

[54] MAGNETIC HEAD HAVING FERROMAGNETIC AMORPHOUS ALLOY MULTI-LAYERED FILM

[75] Inventors: Noriyuki Kumasaka, Ome; Shigekazu Otomo, Sayama; Takeo Yamashita, Tachikawa; Noritoshi Saito, Hachioji, all of Japan

[73] Assignee: Hitachi, Ltd., Tokyo, Japan

[21] Appl. No.: 872,287

[22] Filed: Jun. 10, 1986

[30] Foreign Application Priority Data

Jun. 14, 1985 [JP] Japan ................. 60-128129

[51] Int. Cl.⁴ .............................. G11B 5/16
[52] U.S. Cl. .................................. 360/126
[58] Field of Search ............. 360/126, 119, 122–123, 360/125

[56] References Cited

FOREIGN PATENT DOCUMENTS 57-152510  9/1982  Japan ............................ 360/126
60-237609 11/1985  Japan ............................ 360/126

Primary Examiner—John H. Wolff
Attorney, Agent, or Firm—Antonelli, Terry & Wands

[57] ABSTRACT

A magnetic head includes ferromagnetic amorphous alloy multi-layer films each composed of an alternate lamination of ferromagnetic amorphous alloy layers and magnetic spacer layers. The thickness of each ferromagnetic amorphous alloy layer is of 1 $\mu$m to 10 $\mu$m. The thickness of each magnetic spacer layer is of 0.01 $\mu$m to 0.2 $\mu$m. The ferromagnetic amorphous alloy multi-layer films constitute at least parts of the head core.

5 Claims, 3 Drawing Sheets

MAGNETIC HEAD HAVING FERROMAGNETIC AMORPHOUS ALLOY MULTI-LAYERED FILM

BACKGROUND OF THE INVENTION

The present invention generally relates to a magnetic head for a magnetic recording apparatus. More particularly, the invention concerns a magnetic head which is advantageously suited for use in a magnetic recording apparatus designed for high density magnetic recording such as a VTR and a magnetic disk apparatus in which a high coercive force magnetic recording medium is employed, a magnetic disk apparatus in which a perpendicular magnetic recording method is adopted and the like.

A ferromagnetic amorphous alloy film promises a useful magnetic material in view of the fact that it has excellent characteristics as a soft magnetic material such as high permeability characteristics over a wide range of compositions and high saturation flux density beyond 10 KG.

Japanese Patent Unexamined Publication No. 155,513/83 discloses, a magnetic head in which each of core blocks constituting parts of the head has an end face inclined toward a magnetic gap interposed between the core blocks, wherein a ferromagnetic amorphous alloy film exhibiting a high saturation flux density is deposited on each of the inclined end faces of the core blocks.

More specifically, these heads are mainly composed of a first core block, a second core block and an excitation coil wound on the first core block. Each of the first and second core blocks is formed of ferrite or the like material and includes a protective core portion having a ridge of a mountain-like shape located substantially at a center of the end face of the core block facing in opposition to the magnetic gap, and a ferromagnetic amorphous alloy film deposited on the end face of the protective core portion and exhibiting a high saturation flux density.

The first core block, the ridge thereof and the ferromagnetic amorphous alloy film on one hand and the second core block, the ridge thereof and the ferromagnetic amorphous alloy film deposited thereon on the other hand have respective shapes symmetrical relative to the interposed magnetic gap and are bonded together by a bonding agent such as a glass material.

The magnetic head according to the prior proposal is designed for the use primarily in a VTR, floppy-disc drive and the like in which the track width is in a range of ca. 10 $\mu$m. The thickness of the ferromagnetic amorphous alloy film employed in the magnetic head under consideration is about 5 m to 150 $\mu$m. The ferromagnetic amorphous alloy film of the thickness on the order mentioned above suffers remarkable dispersion in the magnetic anisotropy, involving reduction in the permeability. In other words, the magnetic characteristics inherent to the ferromagnetic amorphous alloy forming the film are not fully made use of. As a consequence, recording and reproducing characteristics may not be satisfactory for the magnetic head.

Similar heads are disclosed in U.S. Pat. Nos. 4,559,572 and 608,407.

Conventionally, in order to enhance the recording and reproducing characteristics of the head, the ferromagnetic amorphous alloy film for the head core material is implemented in a laminated multi-layer structure in which ferromagnetic metal layers are laminated with interposition of insulation layers of $SiO_2$, $Al_2O_3$ or the like in an effort to ensure a high permeability even in a high frequency band.

When the multi-layered ferromagnetic amorphous alloy film including the interposed insulation layers referred to as spacer layers is applied to a magnetic head, the effects as obtained are very significant. In reality, excellent recording/reproducing characteristics can be realized over a wide frequency range inclusive of a high frequency band. It is however noted that when the insulation layer is employed as the spacer layer in implementing the multi-layer structure of the ferromagnetic amorphous alloy film, there may arise such a case in which the spacer layer functions as a pseudo-magnetic gap, imposing restriction to the design of structure of the magnetic head as well as the multi-layer film and thus making it difficult to realize the magnetic head on optimum conditions.

SUMMARY OF THE INVENTION

An object of the present invention is to eliminate the drawbacks described above and to provide a magnetic head which is excellent in the high density recording-/reproducing characteristics.

In view of the above objects, there is proposed according to an aspect of the present invention a magnetic head which includes ferromagnetic amorphous alloy multilayer films each of which is composed of alternate lamination of ferromagnetic amorphous alloy layers and magnetic spacer layers, wherein the thickness of a ferromagnetic amorphous alloy layer is in a range of 1 $\mu$m to 10 $\mu$m while that of the single spacer layer is in a range of 0.01 $\mu$m to 0.2 $\mu$m, and the ferromagnetic amorphous alloy multilayer films constitute at least parts of the core of the magnetic head.

The inventors have discovered that when the non-magnetic insulation spacer layers employed heretofore in implementing the ferromagnetic amorphous alloy multi-layer film are replaced by the magnetic spacer layers, there can be realized a novel ferromagnetic amorphous alloy multi-layer film which exhibits a low coercive force and a high permeability even in a high frequency region, and found that the magnetic head incorporating such novel multi-layer films exhibits excellent recording/reproducing characteristics. Such excellence in characteristics may be explained by the fact that the dispersion in magnetic anisotropy can be significantly reduced by realizing the ferromagnetic amorphous alloy film in a multi-layer structure by using the magnetic space layers, while the magnetic domain structure can be stabilized, assuring thus reduction of change in the permeability in the course of time lapse. Further, by virtue of the magnetic spacer layers, the pseudo-gap action can be suppressed, to a further advantage.

In realization of the ferromagnetic amorphous alloy multi-layer film, it is preferred that the thickness of the ferromagnetic amorphous alloy layer is in a range of 1 $\mu$m to 10 $\mu$m while that of the magnetic spacer layer is in a range of 0.01 $\mu$m to 0.2 $\mu$m. More preferably, the thickness of the former should be of 2 $\mu$m to 5 $\mu$m with that of latter being of 0.01 $\mu$m to 0.1 $\mu$m.

DESCRIPTION OF THE PREFERRED EMBODIMENTS

Now, the present invention will be described in detail in conjunction with an exemplary embodiment thereof by referring to FIGS. 1, 2 and 3.

Figure 1:
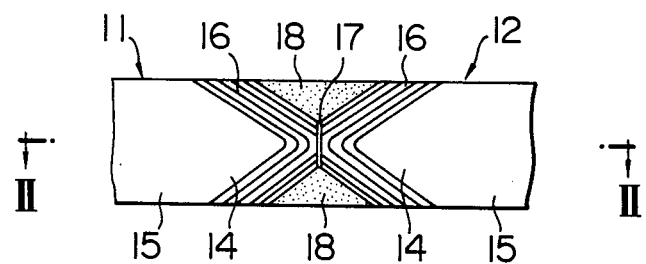
FIG. 1 is a plan view of a magnetic head according to an embodiment of the invention as viewed from a recording medium.

FIG. 1 shows a magnetic head including ferromagnetic amorphous alloy multi-layer films according to an embodiment of the invention in a plan view as observed from the surface of a recording medium located in opposition to the magnetic head. As will be seen in the figure, the magnetic head is mainly composed of a first core block 11, a second core block 12 and a window 21 formed in the first core block 11 for accommodating windings of a coil. Each of the first core block 11 and the second core block 12 may be made of a bulk magnetic material such as ferrite or a non-magnetic material such as ceramics or the like, and each of which includes a protective core 15 having a ridge 14 of a mountain-like shape formed substantially at a center of an end face of the core 15 located in opposition to the magnetic gap, and a ferromagnetic amorphous alloy multi-layer film 16 deposited on the aforementioned end face of the protective core 15 and exhibiting a high permeability at a high saturation flux density. Both the ferromagnetic amorphous alloy multi-layer films 16 of the core blocks 11 and 12 are disposed in opposition to each other with a magnetic gap element 17 interposed therebetween. The core blocks 11 and 12 are bonded together by a reinforced glass material 18. Referring to FIG. 3, the ferromagnetic amorphous alloy multi-layer film 16 is constituted by main magnetic layers 19 each formed of a ferromagnetic amorphous alloy containing at least one of Co, Fe and Ni as a main component and spacer ferromagnetic layers 20 formed of a polycrystalline or amorphous magnetic material.

More specifically, the main magnetic layer 19 may be formed of an alloy containing as a main component or components thereof at least one element selected from a group consisting of Co, Fe and Ni and added with an element or elements such as Zr, Nb, W, Ti, Ta, Hf, Y, Cr, Mn, Ge, Al, Mo, Sn, Be or the like or alternatively it may be formed of an alloy containing in addition to the aforementioned main component and added elements at least one element selected from a group consisting of P, C, B and Si. As practical examples of the alloy under consideration, there may be mentioned those containing Co—Nb, Co—Zr, Co—Ta or Co—Hf as the main component and added with the element mentioned above. In some applications, a rare metal element such as Au, Ag, Pt, Ru, Pd or the like may be added in a small amount for the purpose of adjustment of a magnetostriction constant and/or adjustment of crystallization temperature.

On the other hand, when a polycrystalline magnetic material is employed as the spacer magnetic layer 20, the former may be a single-element material of Co, Ni or Fe or an alloy such as Ni—Fe (permalloy), Fe—Al—Si (sendust) or the like. In case the spacer magnetic layer 20 is formed of an amorphous magnetic material, the latter may be selected from the group of the alloys used for forming the main magnetic layer enumerated above. It is however noted that the amorphous magnetic material should preferably be an alloy whose components differ from those used for forming the main magnetic layer 19 or whose composition differs from the alloy forming the latter. Further, oxide such as ferrite may be used to this end.

Figure 2:
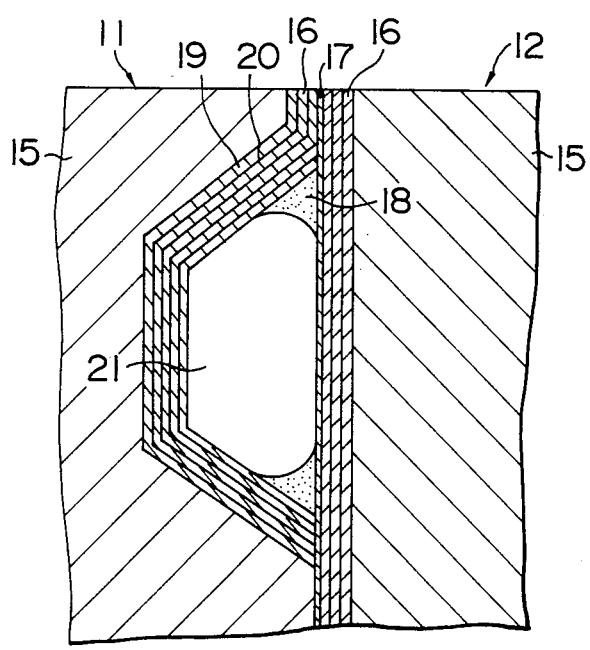
FIG. 2 is a sectional view taken along a line II—II in FIG. 1.
Figure 3:
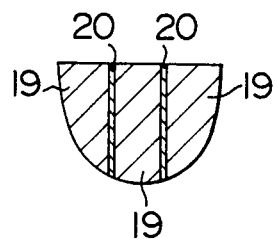
FIG. 3 is an enlarged fragmental sectional view showing a structure of a ferromagnetic amorphous alloy multi-layer film according to the teaching of the invention.

FIG. 2 is an enlarged sectional view of the magnetic head taken along the line II—II in FIG. 1. As will be seen in this figure, the ferromagnetic amorphous alloy multilayer film 16 is deposited on the inner surface of the coiled winding window 21 so as to form a closed magnetic circuit. When the protective core 15 is formed of a bulk magnetic material such as Mn - Zn ferrite, Ni - Zn ferrite or the like, a ferrite magnetic path is formed in corporation with the ferromagnetic amorphous alloy multi-layer film 16, whereby a magnetic head of a high efficiency can be realized.

On the other hand, when the protective core is formed of a nonmagnetic material such as ceramics, glass or the like, the S/N ratio is improved due to reduction of sliding noise. Moreover, because of reduction in core inductance, the number of turns of the coil can be substantially increased, which in turn means that the output performance of the magnetic head can be significantly enhanced, to another advantage.

Next, description will be made on the results obtained from the examination of structure of the ferromagnetic amorphous alloy multi-layer film and the magnetic characteristics. The following Table 1 shows typical examples of the ferromagnetic amorphous alloy multi-layer film deposited by a sputtering process. More specifically, the Table 1 shows magnetic characteristics of the multilayer films in which the main magnetic layer is formed of $Co_{85}$—$Nb_{12}$—$Zr_3$ (atomic %) and the spacer magnetic layer is formed of $Ni_8$—$Fe_{20}$ (atomic %).

TABLE 1

| No. | Main layer(s) $Co_{85}Nb_{12}Zr_3$ | Spacer layers $Ni_{80}Fe_{20}$ | Entire film thickness (μm) | Bs (KG) | Hc (Oe) | μ at 5 MHz |
|---|---|---|---|---|---|---|
| 1 | 40 μm (1 layer) | — | 40 | 9.8 | 0.4 | 500 |
| 2 | 2 μm (20 layers) | 0.01 μm (19 layers) | 40 | 9.8 | 0.2 | 3000 |
| 3 | 5 μm (8 layers) | 0.05 μm (7 layers) | 40 | 9.8 | 0.2 | 2000 |
| 4 | 10 μm (4 layers) | 0.05 μm (3 layers) | 40 | 9.8 | 0.3 | 1000 |

In the above Table 1, a row identified by No. 1 indicates magnetic characteristics of a single layer of $Co_{85}Nb_{12}Zr_3$ having a thickness of 40 μm. More specifically, this layer exhibits a saturation magnetic flux density Bs of 9.8 KG, a coercive force Hc of 0.4 Oe and a relative permeability μ of 500. It will be seen that the relative permeability is remarkably low. In contrast, the multilayer films of $Co_{85}Nb_{12}Zr_3/Ni_{80}Fe_{20}$ according to the present invention as identified by the specimen Nos. 2, 3 and 4 exhibit high relative permeabilities, respectively. Further, it is seen that the coercive force Hc is low.

Figure 4:
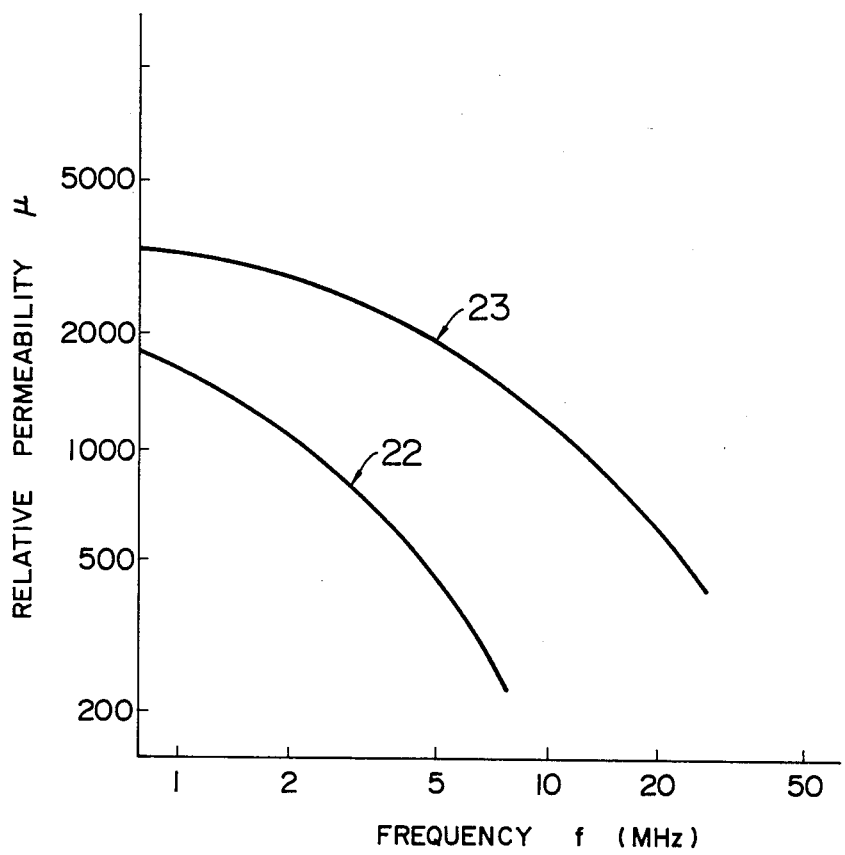
FIG. 4 is a view for graphically illustrating magnetic characteristics of the ferromagnetic amorphous alloy multi-layer film in comparison with those of a hitherto known ferromagnetic amorphous alloy single-layer film.

FIG. 4 is a view for graphically illustrating frequency characteristics of the relative permeabilities of the specimens Nos. 1 and 2 listed in the Table 1. As will be seen in the figure, the multi-layer film (a curve 23) of the specimen No. 3 exhibits an improved high frequency characteristic of the relative permeability excellent over that of the single-layer film (a curve 22) of the specimen No. 1. In this connection, it has been heretofore known that the relative permeability of the ferromagnetic amorphous alloy also of a single layer can be increased to 3000 or more through heat treatment thereof in a rotating magnetic field. However, it should be noted that heat treatment or thermal processing in the manufacturing facturing process of the magnetic head brings about remarkable deterioration in the frequency characteristics of the magnetic head. In contrast, the magnetic head including the ferromagnetic multi-layer film according to the teachings of the invention scarcely suffers such deteriorations, to a great advantage.

Figure 5:
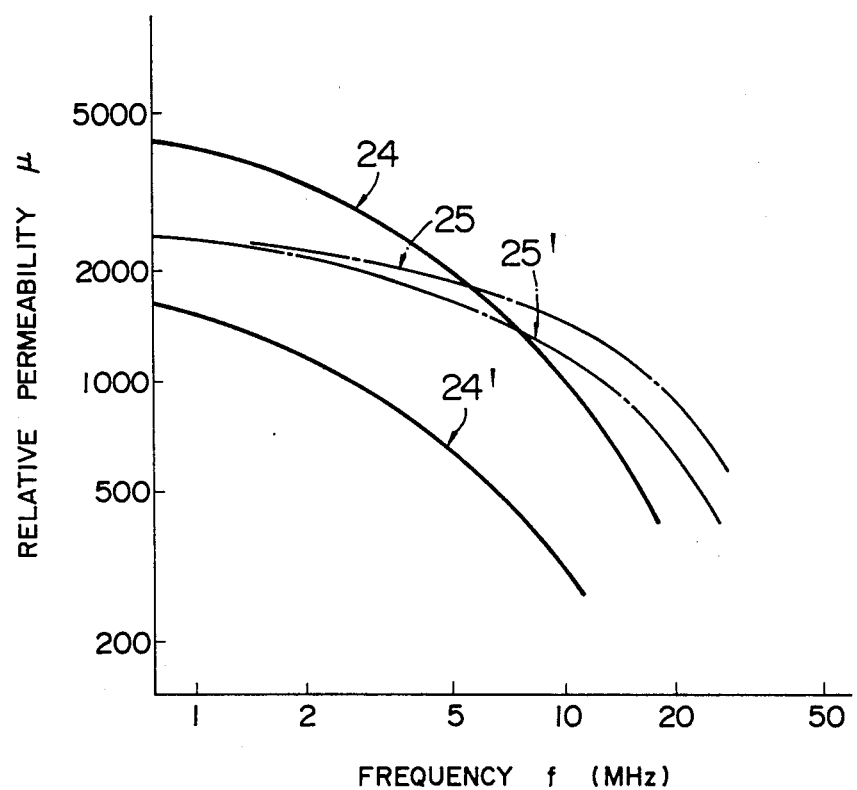
FIG. 5 is a view for graphically illustrating magnetic characteristics of the ferromagnetic amorphous alloy multi-layer film according to the invention which underwent heat treatment in comparison with those of the heat-treated ferromagnetic amorphous alloy single-layer film.

By way of example, FIG. 5 shows graphically the frequency characteristics of the relative characteristics of the specimens Nos. 1 and 3 obtained after heat treatment conducted in a rotating magnetic field of 10 KOe rotating at 60 r.p.m. at a heating temperature of 350° C. for 30 minutes. In the figure, a curve 24 represents the characteristic of the single-layer film of the specimen No. 1, while a curve 25 represents that of the multi-layer film of the specimen No. 3. On the other hand, curves 24' and 25' represent the results of the heat treatment performed again at 350° C. without being subjected to the magnetic field. As will be clearly seen by comparing the curve 24 with the curve 24', deterioration of the single-layer film is very significant. In contrast, it has been found that the multi-layer film according to the present invention undergoes deterioration only a little, as will be appreciated from the comparison of the curve 25 with the curve 25'.

For the purpose of evaluation, magnetic heads were fabricated by using the single-layer film and the multi-layer film described above and operated by employing a metal tape having a high coercive force in a frequency band higher than 5 MHz. A difference of 2 to 3 dB was found between the reproduced outputs of these heads. Furthermore, the multi-layer film can enjoy another feature advantageous over the single-layer film in that dispersion of the characteristics is much reduced.

In the following Table 2, there are listed magnetic characteristics obtained in the main magnetic film constituted by an amorphous Co—Nb—Zr alloy film when the composition of the spacer magnetic film is varied.

TABLE 2

| No. | Main layers Co—Nb—Zr | Spacer layers | Entire film thickness ($\mu m$) | Bs (KG) | $\mu$ at 5 MHz |
|---|---|---|---|---|---|
| 5 | 5 $\mu m$ (10 layers) | Ni 0.05 $\mu m$ (9 layers) | 50 | 9.8 | 2000 |
| 6 | 5 $\mu m$ (10 layers) | Co 0.01 $\mu m$ (9 layers) | 50 | 9.9 | 1500 |
| 7 | 5 $\mu m$ (10 layers) | $Co_{80}Mo_{9.5}Zr_{10.5}$ 0.05 $\mu m$ (9 layers) | 50 | 9.5 | 2000 |
| 8 | 5 $\mu m$ (5 layers) | Ni 0.05 $\mu m$ (4 layers) | 25 | 9.8 | 2500 |
| 9 | 5 $\mu m$ (5 layers) | Co 0.01 $\mu m$ (4 layers) | 25 | 9.8 | 1800 |
| 10 | 5 $\mu m$ (5 layers) | $Co_{80}Mo_{9.5}Zr_{10.5}$ 0.05 $\mu m$ (4 layers) | 25 | 9.7 | 2600 |

As will be seen in the Table 2, whether the spacer magnetic layer is formed of a single-element material or a ferromagnetic amorphous Co—Mo—Zr alloy in the Table 2, there can be obtained substantially same magnetic characteristics as those listed in the Table 1. Furthermore, it has been found that the relative permeability of the multi-layer films listed in the Table 2 do not suffer any appreciable deterioration even under the influence of the heat treatment.

The following Table 3 shows magnetic characteristics obtained when the composition of the main magnetic layer is varied while the spacer magnetic layer is constituted by a Ni—Fe alloy.

TABLE 3

| No. | Main layers | Spacer layers $Ni_{80}Fe_{20}$ | Entire film thickness ($\mu m$) | Bs (KG) | $\mu$ at 5 MHz |
|---|---|---|---|---|---|
| 11 | $Co_{89}W_3Zr_8$ 2 $\mu m$ (10 layers) | 0.05 $\mu m$ (9 layers) | 20 | 12 | 2500 |
| 12 | $Co_{90.5}Zr_{9.5}$ 2 $\mu m$ (10 layers) | 0.05 $\mu m$ (9 layers) | 20 | 14 | 2300 |
| 13 | $Co_{87}Zr_8B_5$ 2 $\mu m$ (10 layers) | 0.05 $\mu m$ (9 layers) | 20 | 12.5 | 2500 |
| 14 | $Co_{93}Ta_4Zr_3$ 2 $\mu m$ (10 layers) | 0.05 $\mu m$ (9 layers) | 20 | 14 | 2500 |
| 15 | $Co_{89}W_3Zr_8$ 5 $\mu m$ (8 layers) | 0.05 $\mu m$ (7 layers) | 40 | 12 | 2000 |
| 16 | $Co_{93}Ta_4Zr_3$ 5 $\mu m$ (8 layers) | 0.05 $\mu m$ (7 layers) | 40 | 14 | 2000 |

In the Table 3, there are listed among others those ferromagnetic amorphous alloys which exhibit particularly high saturation magnetic flux density. In general, the ferromagnetic amorphous alloy film containing a relatively large amount of Co as listed in the Table 3 exhibits a significant anisotropy in the magnetic field and is likely to be deteriorated through heat treatment. In the light of this fact, it will be seen that implementation in a multi-layer structure is accompanied by advantageous effects.

It should be mentioned that the main magnetic layer in the multi-layer film according to the present invention be preferably realized in a thickness of 1 $\mu m$ to 10 $\mu m$. When the thickness is smaller than 1 $\mu m$, a lot of time will be requred for forming a thick film, undesirably for practical applications. On the other hand, when the layer thickness is greater than 10 $\mu m$, dispersion in the magnetic anisotropy becomes significantly increased, resulting in a reduced relative permeability at a high frequency. Besides, the relative permeability will be deteriorated in the course of the magnetic head fabricating process. Thus, the layer thickness in concern should preferably be in a range of 2 μm to 5 μm.

The thickness of the spacer magnetic layer should be of 0.01 μm to 0.2 μm. When smaller than 0.01 μm, the effects due to the multi-layer structure will be reduced to such an extent that the magnetic characteristics as obtained become comparable to those of the single layer film. On the other hand, when the layer thickness is greater than 0.2 μm, a pseudo-gap effect will undersirably make appearance if the magnetic characteristics thereof differ remarkably from those of the main ferromagnetic layer. Thus, the thickness should be more preferably in a range from 0.02 μm to 0.1 μm.

The entire thickness of the ferromagnetic amorphous alloy film should be preferably in a range from 5 μm to 150 μm.

As will now be appreciated from the foregoing description, the magnetic head having the ferromagnetic amorphous alloy films of a multi-layer structure according to the invention in which the spacer layers formed heretofore of a non-magnetic insulation material with a view to enhancing the high frequency recording and reproducing characteristics are replaced by the magnetic space layers can enjoy an improved noise reduction effect in the recording and reproducing characteristics because the inter-layer pseudo-gap effect can be suppressed to a minimum. Furthermore, the ferromagnetic amorphous alloy multi-layer film according to the present invention scarcely undergoes deterioration in the magnetic characteristics under the influence of the heat treatment and other process in the course of fabrication of the magnetic head. It should be added that the reproduction output of the magnetic head according to the present invention is higher than that of the magnetic head composed of the single-layer film of ferromagnetic amorphous alloy by 2 dB to 3 dB. Besides, dispersion in the performance of the magnetic heads can be reduced to a minimum.

We claim:

1. A magnetic head, comprising ferromagnetic amorphous alloy multi-layer films each of which is constituted by an alternate lamination of ferromagnetic amorphous alloy layers and magnetic spacer layers, the layer thickness of said ferromagnetic amorphous alloy layer being in a range of 1 μm to 10 μm, while the thickness of said magnetic spacer layer is in a range of 0.01 μm to 0.2 μm, said ferromagnetic amorphous alloy multlayer films constituting at least parts of head cores.

2. A magnetic head according to claim 1, wherein the thickness of the ferromagnetic amorphous alloy layer is in a range of 2 μm to 5 μm, while the thickness of said spacer layer is in a range of 0.02 μm to 0.1 μm.

3. A magnetic head including two core blocks bonded together with a magnetic gap being interposed therebetween, each of said core blocks being composed of a protective core portion and a ferromagnetic amorphous alloy multilayer film disposed on said protective core portion to form a magnetic circuit, at least one of said core blocks having a window for accommodating therein a coil winding, wherein said ferromagnetic amorphous alloy multi-layer film includes ferromagnetic amorphous alloy layers each having a thickness of 1 μm to 10 μm and magnetic spacer layers each having a thickness of 0.01 μm to 0.2 μm.

4. A magnetic head according to claim 3, wherein the thickness of one ferromagnetic amorphous alloy layer is in a range of 2 μm to 5 μm, while the thickness of the spacer layer is in a range of 0.02 μm to 0.1 μm.

5. A magnetic head according to claim 3, wherein the thickness of said ferromagnetic amorphous alloy multi-layer film is in a range of 5 μm to 150 μm.

* * * * *